United States Patent Office 2,717,662
Patented Sept. 13, 1955

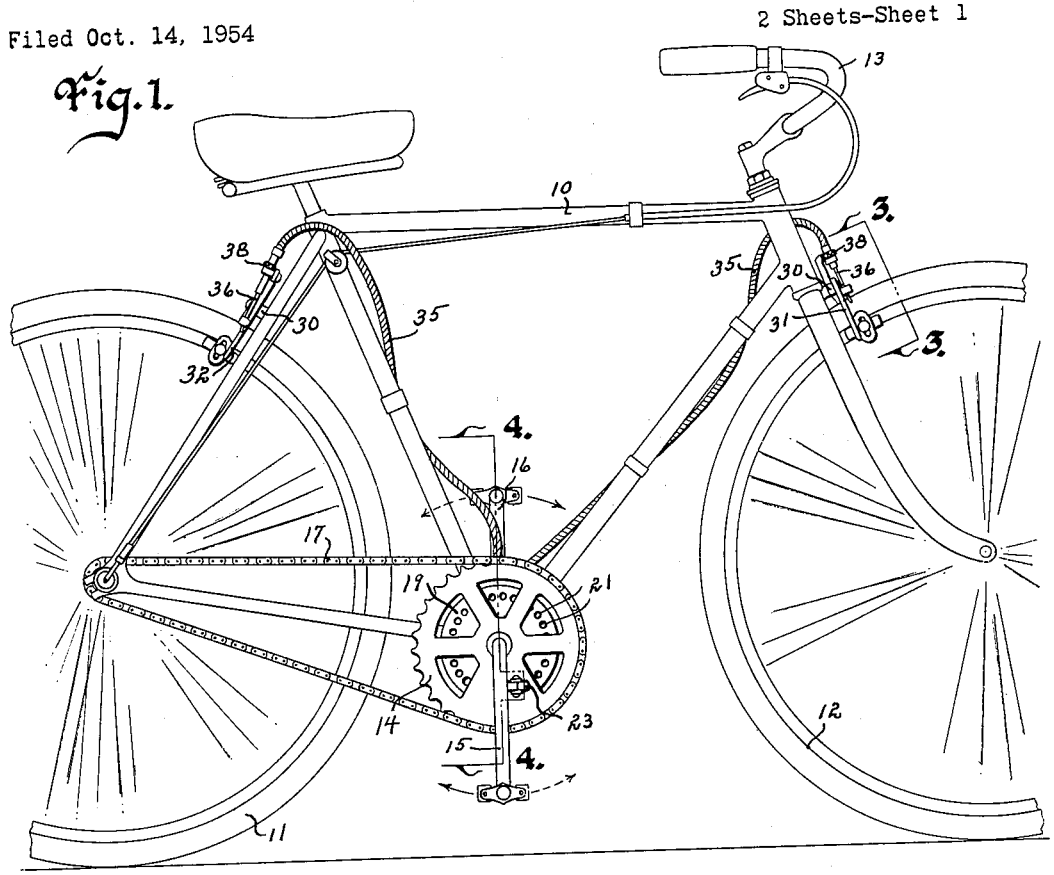
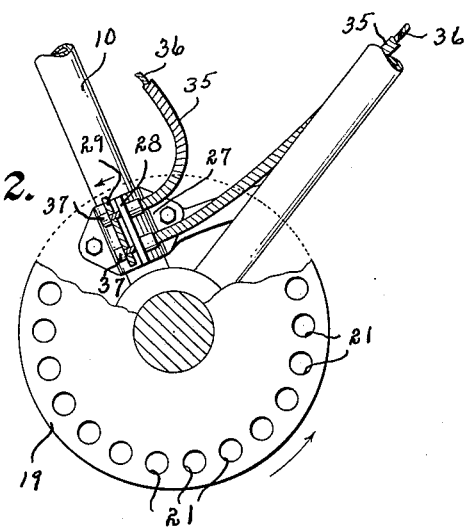

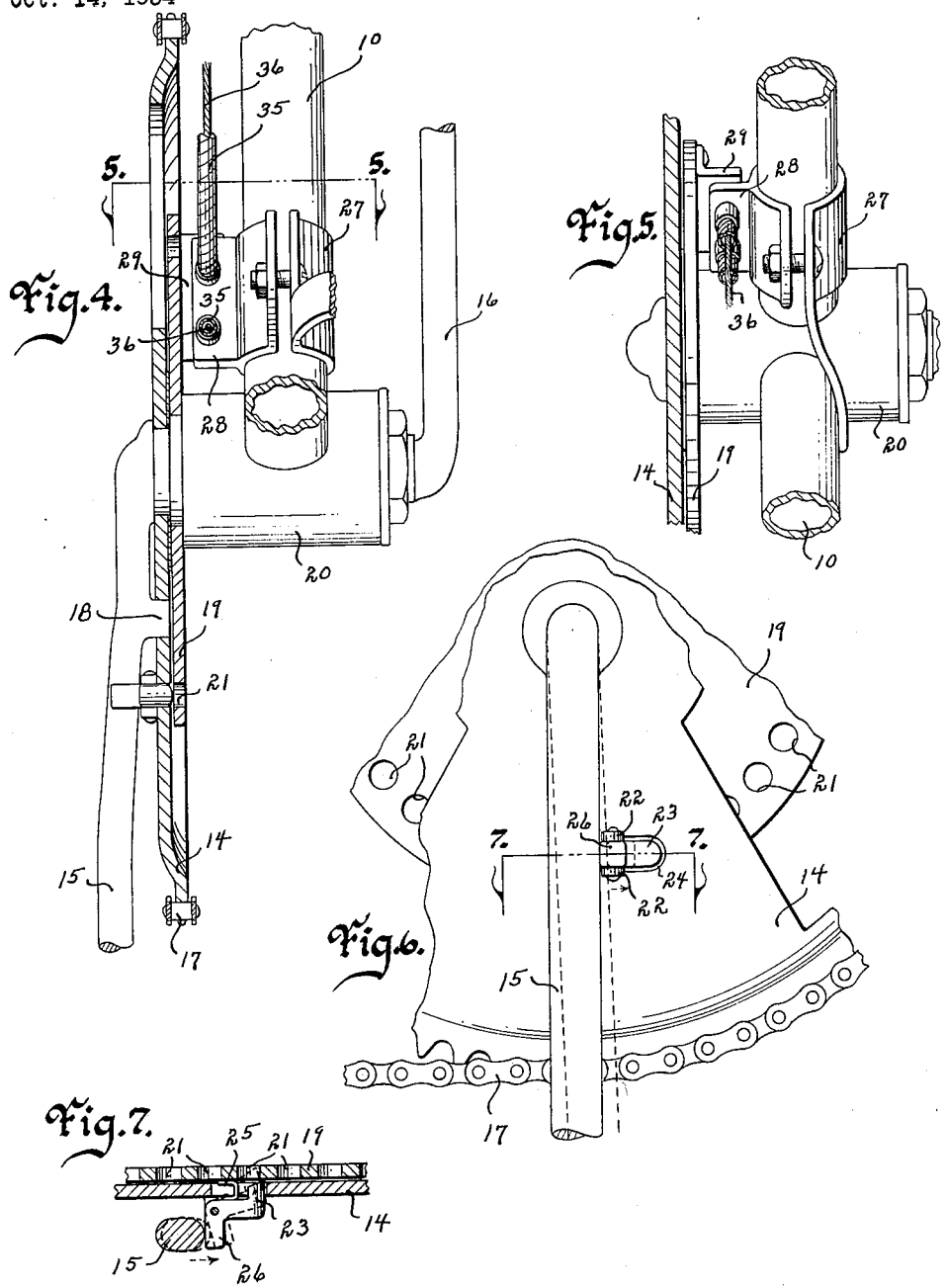

2,717,662

BRAKING MEANS FOR BICYCLES

Thomas Thompson, Des Moines, Iowa

Application October 14, 1954, Serial No. 462,280

9 Claims. (Cl. 188—27)

This invention relates to bicycle brake mechanism and more particularly to the wheel rim brake type.

Most bicycles manufactured and sold herebefore in this country have had a coaster brake means incorporated in the rear wheel hub. Recently, however, there has been a decided trend to "racing type" bicycles having no brake in the hub, but relying on handle bar grip levers for applying wheel brakes. While such bicycles do eliminate "coaster brake drag" and are ideal for two or more gear ratios, the manual operation of the brake means is most objectionable. First, the applying of the brakes requires a certain relaxation of the hands on the handlebar grips, and this is at the moment when complete control of the bicycle may well be imperative. Secondly, inasmuch as one lever brakes the front wheel, and one lever brakes the rear wheel, the stronger braking of the front wheel often causes accidents by the rear end of the bicycle turning vertically over its front end.

Therefore, the principal object of my invention is to provide a bicycle braking mechanism that is exterior of the wheels and is solely operated by the bicycle pedals.

A further object of my invention is to provide a braking means for bicycles that has no material drag.

A still further object of this invention is to provide a wheel rim braking means for bicycles that is operated entirely by the feet of the user.

Still further objects of this invention are to provide a coaster and wheel rim braking means for bicycles that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side view of a bicycle with my device installed thereon,

Fig. 2 is an enlarged view of the brake operating plate,

Fig. 3 is an enlarged end view of my rim brake and is taken on line 3—3 of Fig. 1, Fig. 4 is an enlarged cross sectional view of the hanger portion of the bicycle and is taken on line 4—4 of Fig. 1 to more fully illustrate its construction, Fig. 5 is an enlarged horizontal sectional view of the hanger portion taken on line 5—5 of Fig. 4, Fig. 6 is an enlarged side sectional view of the hanger portion showing the latch portion, and Fig. 7 is an enlarged horizontal view of the latch means taken on line 7—7 of Fig. 6.

In these drawings I have used the numeral 10 to generally designate a bicycle having a rear wheel 11, a front wheel 12, and the handle bar 13. The hanger portion of the bicycle has the usual sprocket wheel 14, pedal crank arms 15 and 16, and the drive chain 17. This type of non-hub brake bicycle is standard and it is to such a coaster bicycle that I use my invention. However, I do require a certain play or tolerance between the pedal crank and the sprocket wheel. I provide this limited independent movement by slightly enlarging the arcular length of the hole in the sprocket gear into which the pedal crank arm lug 18 extends. The numeral 19 designates my brake operating plate which is rotatably mounted on the hanger bearing portion 20 and is closely adjacent the sprocket gear 14, as shown in Fig. 4. The numeral 21 designates a continuous row of holes or apertures adjacent the periphery of the plate 19. This plate 19 rests at the inner side of the sprocket gear 14. On the outer side of the sprocket gear 14, I have provided two spaced apart bearing ears 22, as shown in Fig. 6. The numeral 23 designates a latch pawl pivoted between the bearing ears 22. There is a hole 24 in the sprocket gear face through which the pawl 23 may operate, and this hole and the pawl registers with the row of holes 21 on the plate 19 so that the pawl 23 may selectively enter and engage any one of these holes 21. Obviously, when the pawl 23 is in engagement with a hole 21, the sprocket gear 14 will be locked to the plate 19, at least in one direction. A spring 25 yieldingly holds the pawl 23 out of engagement with the row of holes 21. The bearing ears 22 are at the forward side of the crank arm 15 when the crank arm is in lowered condition, as shown in Fig. 1. The numeral 26 designates a lug portion on the pawl 23 which is capable of being engaged by the pedal arm 15 when the pedal arm 15 is cranked backwardly, as shown in Fig. 7. Inasmuch as there is a slight play between the crank arm and the sprocket gear 14, any backward cranking movement of the arm 15 will cause its engagement with the lug portion 26 and thereby pivot the pawl 23, forcing the same into engagement with one of the holes 21. Conversely, any forward cranking of the pedal arms will move the crank arm 15 away from the lug portion 26 and the spring 25 will move the pawl 23 outwardly from engagement with one of the holes 21, thus unlocking the plate 19 from the sprocket gear 14. The effective end of the pawl 23 may be formed at an angle, as shown in Fig. 7, for aiding the withdrawal of the pawl from one of the holes 21 when the sprocket gear 14 starts to turn to the right. By this arrangement of parts, when the pedals are being rotated forwardly, the plate 19 will be out of engagement with the sprocket gear 14 and this gear 14 will be rotated to the right, which in turn will rotate the endless chain 17 and propel the bicycle forwardly. However, any back pedaling will cause the plate 19 to be locked to the sprocket gear 14 and its direction of rotation would be to the left or rearwardly. The numeral 27 designates a clamp secured to the frame of the bicycle and adjacent the hanger bearing 20, as shown in Fig. 4. This clamp 27 has a ledge portion 28 extending toward the plate 19. The numeral 29 designates a ledge on the plate 19 that is spaced apart from and back of the ledge 28, as shown in Fig. 2.

My device can be used for operating the rear rim brake or a rear rim brake and a front wheel rim brake. In Fig. 3 I show a conventional wheel rim brake. There is a supporting bracket portion 30 secured to the frame and a brake lever 31 and a brake lever 32. These two brake levers 31 and 32 are hinged to the support 30 and form a U member which embraces the tire and wheel rim 33. Each brake lever 31 and 32 has a friction element 34 capable of engaging the rim 33. The numeral 35 designates the usual flexible tube having the cable 36. One of the brake levers is secured in the usual manner to the tube 35 and the other brake lever to the cable 36. Both the rear and front flexible conduits 35 are secured against longitudinal movement and extend to and engage the front side of the ledge 28. The rear ends of each of the cables 36, however, extend through the ledge 28, through the ledge 29, and have limiting heads 37 at the rear side of the ledge 29. By this arrangement, when the rider of the bicycle attempts to pedal backwardly, the plate 19 is engaged and will accordingly rotate rearwardly and will increase the distance between the ledges 28 and 29. This action will pull the cables 36 thereby bringing the brake shoes into engagement with the wheel rims, and the bicycle will be effectively braked. Any release of back pressure on the pedals will release the plate 19 from connection with the bicycle pedal assembly and the bicycle will coast thereafter in the usual manner provided it has any momentum. Any forward cranking of the pedal assembly will of course actuate the usual clutch within the rear hub of the bicycle and the bicycle will be propelled forwardly. From this description it will be appreciated that the bicycle may be effectively braked without the use of any handle-bar levers, and merely by back pressure on the pedal assembly. Also it will be noted that the effectiveness of the braking may be easily and quickly adjusted relative to the front and rear wheels. Usually for safety the braking should be more effective on the rear wheel than on the front wheel. This independent brake adjustment of the front and rear wheels is easily accomplished by the adjustment of the nuts 38 on the brackets 30 for longitudinally adjusting the cables 36.

Some changes may be made in the construction and arrangement of my braking means for bicycles without departing from the real spirit and purpose of my invention, and it is my intention to cover by my claims, any modified forms of structure or use of mechanical equivalents which may be reasonably included within their scope.

I claim:

1. In combination with a bicycle having a frame, at least one wheel, a pedal crank assembly, and a sprocket gear operatively connected to the wheel and connected with a tolerance to said pedal crank assembly, a brake means, comprising, a plate member rotatably mounted on said frame and adjacent said sprocket gear; said plate having a circular continuous row of openings, a pawl movably mounted on said sprocket gear and capable of selectively engaging the holes of said row of openings when moved in one direction, a means for yieldingly holding said pawl away from said row of openings, a projection on said pawl capable of being engaged by said pedal crank assembly when said pedal crank assembly is moved backwards relative to said sprocket gear for forcing said pawl into one of said openings and temporarily locking said plate member to said sprocket gear, a braking element capable of engaging the rim of said wheel, and a means operatively connecting said plate member to said brake engaging means.

2. In combination with a bicycle having a frame, at least one wheel, a pedal crank assembly, and a sprocket gear operatively connected to the wheel and connected with a tolerance to said pedal crank assembly, a brake means, comprising, a plate member rotatably mounted on said frame and adjacent said sprocket gear; said plate having a circular continuous row of openings, a pawl movably mounted on said sprocket gear and capable of selectively engaging the holes of said row of openings when moved in one direction, a spring means for yieldingly holding said pawl away from said row of openings, a projection on said pawl capable of being engaged by said pedal crank assembly when said pedal crank assembly is moved backwards relative to said sprocket gear for forcing said pawl into one of said openings and temporarily locking said plate member to said sprocket gear, a braking element capable of engaging the rim of said wheel, and a means operatively connecting said plate member to said brake engaging means.

3. In combination with a bicycle having a frame, at least one wheel, a pedal crank assembly, and a sprocket gear operatively connected to the wheel and connected with a tolerance to said pedal crank assembly, a brake means comprising, a plate member rotatably mounted on said frame and adjacent said sprocket gear; said plate having a circular continuous row of openings, a pawl movably mounted on said sprocket gear and capable of selectively engaging the holes of said row of openings when moved in one direction, a means for holding said pawl away from said row of openings, a projection on said pawl capable of being engaged by said pedal crank assembly when said pedal crank assembly is moved backwards relative to said sprocket gear for forcing said pawl into one of said openings and temporarily locking said plate member to said sprocket gear, a braking element capable of engaging the rim of said wheel, and a means operatively connecting said plate member to said brake engaging means.

4. In combination with a coaster clutch bicycle having a frame, two wheels having rims, a pedal crank means, a sprocket gear operatively connected to one of said wheels and connected with a given limited tolerance to said pedal crank means, a braking means, comprising, a plate member rotatably mounted on said frame and adjacent said sprocket gear having a plurality of holes arranged in a circular row, a pawl latch pivoted on said sprocket gear and capable of selectively entering and engaging said holes in plate member, a means for yieldingly holding said pawl latch away from said plate member, a projection on said pawl latch capable of being engaged by said pedal crank means when said pedal crank means is moved backwards, a rim wheel clamping brake assembly unit on said frame and capable of engaging the rim of one of said wheels, and a cable having one end connected to said plate member and its other end connected to said brake assembly unit.

5. In combination with a coaster clutch bicycle having a frame, two wheels having rims, a pedal crank means, a sprocket gear operatively connected to one of said wheels and connected with a given limited tolerance to said pedal crank means, a braking means, comprising, a plate member rotatably mounted on said frame and adjacent said sprocket gear having a plurality of round holes arranged in a circular row, a pawl latch pivoted on said sprocket gear and capable of selectively entering and engaging said holes in plate member, a means for yieldingly holding said pawl latch away from said plate member, a projection on said pawl latch capable of being engaged by said pedal crank means when said pedal crank means is moved backwards, a rim wheel clamping brake assembly unit on said frame and capable of engaging the rim of one of said wheels, and a cable having one end connected to said plate member and its other end connected to said brake assembly unit.

6. In combination with a coaster clutch bicycle having a frame, two wheels having rims, a pedal crank means, a sprocket gear operatively connected to one of said wheels and connected with a given limited tolerance to said pedal crank means, a braking means, comprising, a plate member rotatably mounted on said frame and adjacent said sprocket gear having a plurality of holes arranged in a circular row, a pawl latch pivoted on said sprocket gear and capable of selectively entering and engaging said holes in plate member, a means for yieldingly holding said pawl latch away from said plate member, a projection on said pawl latch capable of being engaged by said pedal crank means when said pedal crank means is moved backwards, a rim wheel clamping brake assembly unit on said frame and capable of engaging the rim of one of said wheels, and an adjustable cable having one end connected to said plate member and its other end connected to said brake assembly unit.

7. In combination with a coaster clutch bicycle having a frame, two wheels having rims, a pedal crank means, a sprocket gear operatively connected to one of said wheels and connected with a given limited tolerance to said pedal crank means, a braking means, comprising, a plate member rotatably mounted on said frame and adjacent said sprocket gear having a plurality of holes arranged in a circular row, a pawl latch pivoted on said sprocket gear and capable of selectively entering and engaging said holes in plate member, a means for yieldingly holding said pawl latch away from said plate member, a projection on said pawl latch capable of being engaged by said pedal crank means when said pedal crank means is moved backwards, a rim wheel clamping brake assembly unit for each of said two wheels, and two flexible cables extending from said plate member to said two brake assembly units, respectively.

8. In combination with a coaster clutch bicycle having a frame, two wheels having rims, a pedal crank means, a sprocket gear operatively connected to one of said wheels and connected with a given limited tolerance to said pedal crank means, a braking means, comprising, a plate member rotatably mounted on said frame and adjacent said sprocket gear having a plurality of holes arranged in a circular row, a pawl latch pivoted on said sprocket gear and capable of selectively entering and engaging said holes in plate member, a means for yieldingly holding said pawl latch away from said plate member, a projection on said pawl latch capable of being engaged by said pedal crank means when said pedal crank means is moved backwards, a rim wheel clamping brake assembly unit for each of said two wheels, and two individually adjustable flexible cables extending from said plate member to said two brake assembly units, respectively.

9. In combination with a coaster clutch bicycle having a frame, two wheels having rims, a pedal crank means, a sprocket gear operatively connected to one of said wheels and connected with a given limited tolerance to said pedal crank means, a braking means, comprising, a plate member rotatably mounted on said frame and adjacent said sprocket gear, a means for locking said sprocket gear to said plate member, a means for yieldingly holding said sprocket gear out of locked condition with said plate member, a means associated with said pedal crank means and said locking means capable of actuating said locking means when said pedal crank means is moved backwardly, a wheel clamping brake assembly unit on said frame and capable of engaging the rim of one of said wheels, and a cable having one end connected to said plate member and its other end connected to said brake assembly unit.

No references cited.